Dec. 22, 1953          A. L. HOLCOMB          2,663,857
                         CURVE FOLLOWER
Filed Oct. 25, 1951                          2 Sheets-Sheet 1
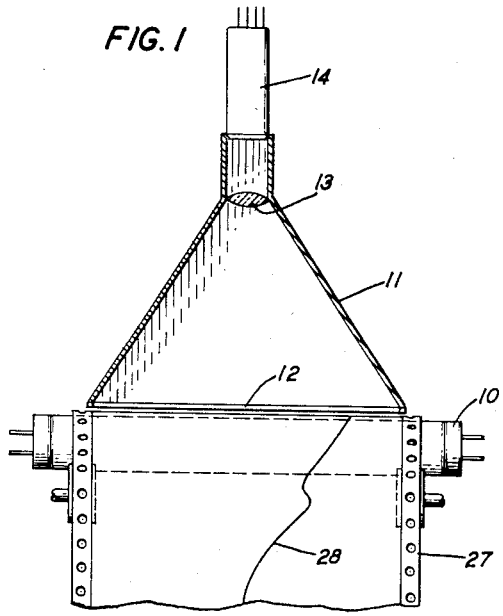
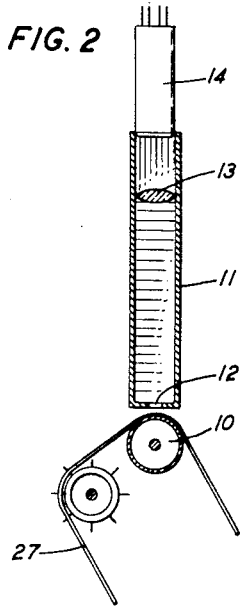
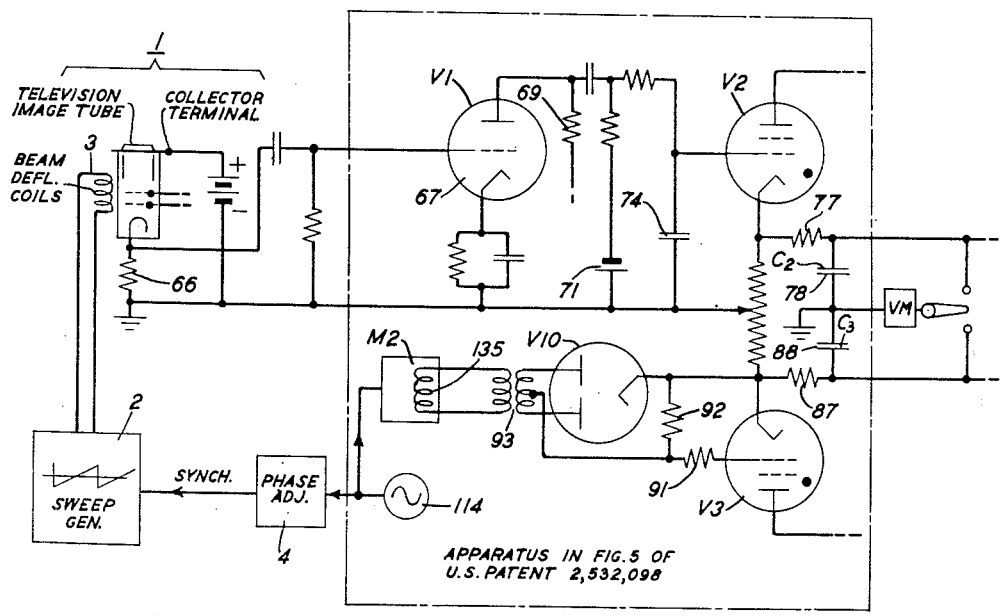
INVENTOR
A. L. HOLCOMB
BY
Walter M. Hill
ATTORNEY

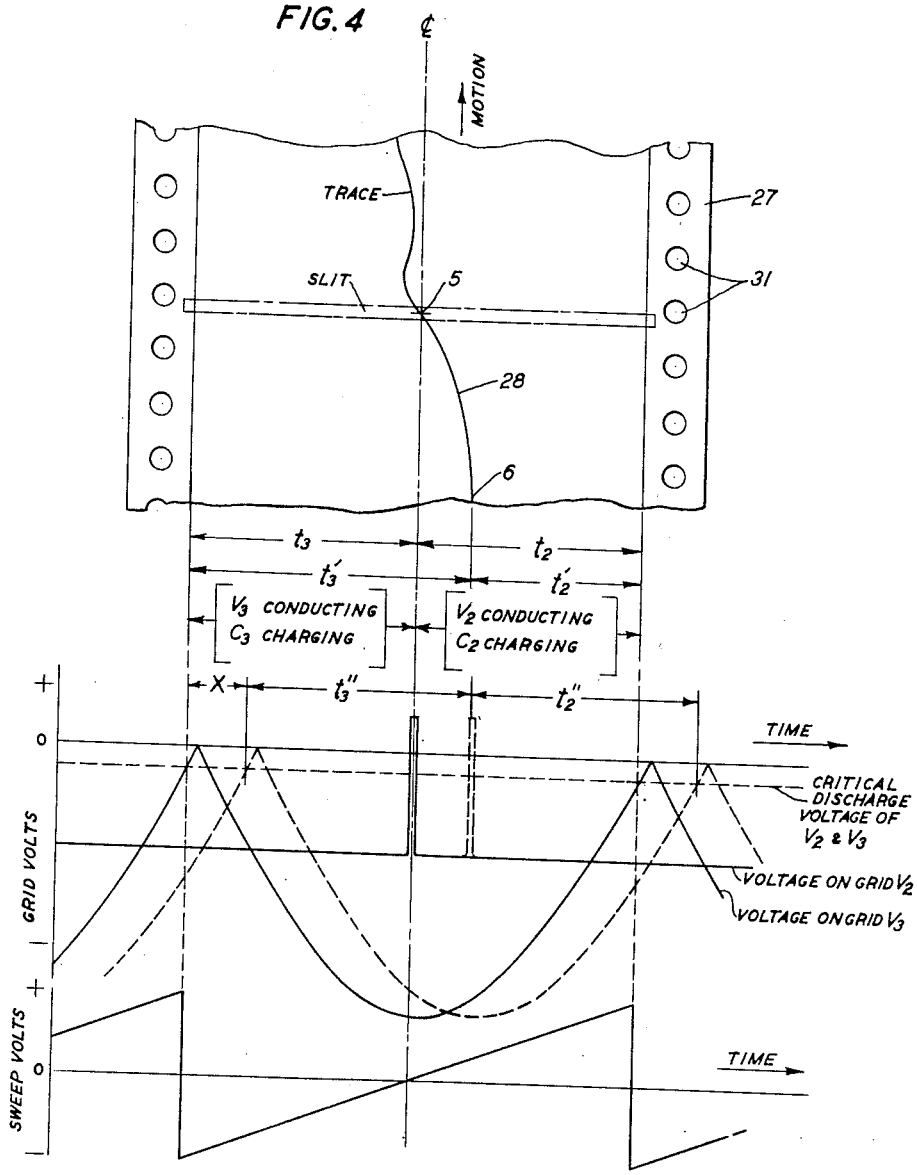

Patented Dec. 22, 1953

2,663,857

UNITED STATES PATENT OFFICE

2,663,857

CURVE FOLLOWER

Arthur L. Holcomb, Tarzana, Calif., assignor to Western Electric Company, Incorporated, New York, N. Y., a corporation of New York Application October 25, 1951, Serial No. 253,187

4 Claims. (Cl. 340—212)

This invention relates to curve or contour-following apparatus and more particularly to an electronic sensing head to be used with apparatus for automatically following a curve or contour of arbitrary shape.

This invention constitutes an improvement in the sensing head of the apparatus forming the subject-matter of my Patent 2,532,098, granted November 28, 1950. In that patent the sensing head comprised a motor-driven optical system having four separate light paths which were successively brought between a light source and a photoelectric cell. While in that position a beam of light from the light source was caused to scan across a chart and the light reflected therefrom was focused upon the photoelectric cell. When the light crossed a curve previously drawn on the chart, a change in reflected light intensity caused an electric pulse to be developed in the photoelectric circuit. The electrical and mechanical structure associated therewith was such as to permit a following mechanism to draw a duplicate of the original curve on a second chart. The uses and advantages of systems of this general nature are apparent from a reading of the specification of the aforesaid patent.

While the rotating optical system worked quite satisfactorily for the purpose originally intended, it was nevertheless a mechanical system and was therefore limited by mechanical factors to considerably lower scanning speeds than those of the present invention. A higher scanning speed permits a high record speed and thus reduces the time required for making copies of the original record. It also makes it practical to copy other types of curves such as variable area sound tracks free from the noise and vibration of a mechanical scanner. An increased response is also achieved.

It is the object of this invention to provide an improved scanning device to be used in combination with a reproducing control system of the type disclosed in the aforesaid patent which scanning device is practically unlimited as to scanning speed.

The foregoing object is achieved by providing an electronic curve-following head comprising a television image tube mounted over a chart or other object containing the curve. An optical system focuses the image of the chart on the image plane of the tube. As the beam scans the image of the curve on the chart, pulses are generated to control the position of the curve-following mechanism.

The invention may be better understood by referring to the accompanying drawings, in which:

Figs. 1 and 2 show two views of an embodiment of the improved sensing head showing its relation to a chart containing a curve to be followed;

Fig. 3 discloses typical circuits of the improved sensing head and their relationship to the circuits of the aforesaid Patent 2,532,098; and Fig. 4 discloses some curves useful in explaining the operation of the invention.

Figs. 1 and 2 disclose two views illustrative of the improved scanning head. A chart 27, containing thereon a curve or trace 28 to be followed, is drawn by means of a conventional sprocket mechanism over a light source 10. Source 10 is preferably a fluorescent tube supplied by direct current using conventional circuits not shown. Superimposed directly over the chart and fluorescent tube and transverse to the direction of motion of the chart is found a light shield 11 containing a slit 12. The latter admits light passing from the fluorescent lamp through the paper chart into the light shield so that an optical system schematically illustrated by a lens assembly 13 may focus the image of the chart at the slit on the image plane of a television image tube 14. It will be understood that as the curve 28 proceeds transversely across the chart 28 a short segment thereof will appear to move back and forth along the length of the slit 12 and consequently across the image thereof on the image plane of the television tube 14.

Television tube 14 may be most any conventional television camera tube, as for example, the iconoscope, orthicon or image orthicon. However, because of its smaller dimensions and simplicity, a relatively new tube known as the vidicon camera tube has been found especially adaptable to this invention and is selected for illustrative purposes. This tube is manufactured by the Radio Corporation of America and a description thereof, together with some typical circuits, may be found on page 70 of the May 1950 issue of Electronics and also on page 70 of the June 1950 issue of Electronics.

With an understanding of the construction and operation of the vidicon tube as obtained from the above-cited publications, it will be understood that if the scanning beam of the tube be caused to move in a single plane parallel to and covering the image of the slit 12 formed by the optical system 13 on the image plane of the tube, a sudden pulse of current will be developed each time the beam crosses the image of the curve 28. This pulse is utilized in the same manner as previously described in the above-mentioned Patent 2,532,098 to cause the following mechanism to trace a duplicate of the curve 28.

Fig. 3 discloses some circuits suitable for the practice of this invention. In this figure the various reference numerals correspond with those found in Fig. 5 of the above-mentioned patent. The scanning structure 1 of the above-mentioned patent is here replaced by the improved electronic scanning device. This device comprises a television image tube having a collector terminal at the target end, a cathode shown connected to ground through resistor 66 and beam deflecting coils schematically illustrated as a single coil 3 connected to a sweep generator 2 for causing the beam to scan along the image of the slit 12 as previously described in connection with Figs. 1 and 2. Circuits for the various electrodes within the tubes and circuits of the focusing coils, etc., have not been shown as they are adequately disclosed in the above-cited publications and are otherwise conventional in the art.

The collector and cathode are connected in circuit with a collector or target bias source in series with a resistor 66. So long as the beam is scanning an illuminated portion of the chart a substantially constant current flows through resistor 66. However, at the instant that the beam reaches the dark image of the curve, this current suddenly reduces, thereby transmitting a sharp negative pulse to the grid 67 of tube $V_1$. As fully described in the above-mentioned patent, this will transmit a sharp positive pulse to the grid of tube $V_2$ thereby causing this tube, which is gas filled, to begin conducting. Circuits not disclosed in Fig. 3, but fully disclosed in the above-mentioned patent, simultaneously cause tube $V_3$ to cease conducting.

The scanning motion of the beam is produced by beam deflector coil 3 under control of sweep generator 2. Sweep generator 2 is of conventional design and adapted to produce a substantially linear sweep voltage having a period equal to a half cycle of the period of source 114 which corresponds to source 114 of the aforementioned patent. A phase adjusting means 4 is connected between source 114 and sweep generator 2 for the purpose of adjusting the start of the sweep to coincide exactly with the instant that tube $V_3$ begins conducting, assuming the trace is exactly at the center of the chart. A suitable amplitude control (not shown) in the sweep generator adjusts the amplitude of the sweep voltage and consequently the length of the sweep to coincide exactly with the width of the image of the chart. The start of the sweep is also adjusted to coincide with one edge of the image of the chart by superimposing a beam centering current in the deflector coil 3 by conventional means not shown.

As described in the aforementioned patent, tube $V_3$ is caused to fire when the rectified current from tube $V_{10}$ produces such a voltage across resistor 92 as to bring the bias on the grid of $V_3$ below its critical value thereby starting the discharge in tube $V_3$ and simultaneously stopping the current in tube $V_2$. This portion of the circuit is identical with the corresponding part of the above-mentioned patent drawing.

It will be evident from what has already been described that this invention provides a substantially unlimited scanning speed such as to enable the apparatus to copy not only a control film but to copy a sound record itself in a practical way. At the higher scanning speeds it will be necessary to substitute the conventional Eccles-Jordan trigger circuit with vacuum tubes instead of the gas tubes $V_2$, $V_3$. This was described at the top of column 6 of the aforementioned patent. A more modern version of the Eccles-Jordan circuit may be found in the book entitled "Time Bases" by O. S. Puckle (1943), page 54.

As fully described in my prior patent, alternating-current source 114 is used to supply field energy to a two-pole motor M2, the rotor 135 of which is connected directly to the primary of transformer 93. By reference to the prior patent it will be understood that motor M2 has its rotor 135 connected through a mechanical servomechanism whereby the phase of the voltage induced in winding 135 is adjustable in accordance with the relative charges on condensers 78 and 80 connected in the cathode circuits of tubes $V_2$ and $V_3$, respectively. While source 114 was referred to in the prior patent as being preferably in order of power frequencies, it is evident that, by reason of the use of the television image tube of the present invention, this source may be an oscillator operating at relatively high frequencies. With tubes $V_2$ and $V_3$ replaced by vacuum tubes in an Eccles-Jordan type circuit, it will also be evident that the frequency of this oscillator is practically unlimited so that the scanning speed may be extremely high.

The operation of the invention may be further illustrated by the use of some typical curves as shown in Fig. 4. In this figure, chart 27 is assumed to be moving in the direction indicated by the arrow. A trace 28 was previously recorded on this chart and is to be reproduced on another chart. The beam of the image tube is being driven across the image of the chart by the sweep voltage shown as a saw-tooth wave at the bottom of Fig. 4. At the maximum negative voltage of this wave the beam is driven to the left edge of the chart and as the sweep voltage proceeds to increase gradually and linearly with time the beam is driven at a constant velocity across the chart from left to right. Each time the beam crosses the trace image a pulse is generated and applied to the grid of tube $V_2$.

Directly above the graph for the sweep voltage will be found a graph of the rectified voltage which is impressed on the grid of tube $V_3$ from rectifier $V_{10}$. It is assumed that this wave form is sinusoidal although it need not necessarily be so. From this graph it will be noted that as the negative bias on the grid of tube $V_3$ lowers to the point where it equals the critical discharge voltage for tubes $V_2$ and $V_3$, tube $V_3$ is caused to conduct. When the trace is at the center of the chart, the instant that tube $V_3$ starts to conduct corresponds with the instant that the sweep voltage begins increasing to drive the scanning beam from left to right across the chart. At this same instant the current through tube $V_2$ is stopped, the voltage on its grid momentarily remaining below the critical discharge voltage for that tube.

Continuing with the assumption that the trace appearing in the slit is at the center of the chart indicated by reference numeral 5, it will be observed from Fig. 4 that as the beam scans across the chart toward the trace, tube $V_3$ continues to conduct during which time condenser $C_3$ is constantly charging. This time interval is represented by $t_3$. When the beam reaches point 5 on the image of the trace, a sudden reduction of current through the collector to cathode space path in the television image tube takes place. As previously described, this introduces a sharp negative pulse on the grid 67 of tube $V_1$ which in turn transmits a sharp positive pulse to the control grid of tube $V_2$. The voltage pulse on the grid of tube $V_2$ is shown in Fig. 4 as a sharp rise at the end of time interval $t_3$. As this voltage rises above the critical discharge voltage of tube $V_2$ it causes tube $V_2$ to conduct and stop the current in tube $V_3$. Tube $V_2$ continues to conduct throughout a time interval $t_2$ which corresponds with the time that the scanning beam is moving from the trace at point 5 to the right-hand edge of the chart image. During this time condenser $C_2$ is constantly charging and, as described in the foregoing patent, the charges on condensers $C_2$ and $C_3$ are made equal under the assumed condition that the trace is at the center of the chart.

At the instant the beam reaches the right-hand edge of the chart image it is substantially instantaneously driven back to the left-hand edge by a sudden drop in deflector voltage as indicated by the saw-tooth wave form for the sweep voltage shown at the lower side of Fig. 4.

Now let it be assumed that the chart has progressed to where point 6 of trace 28 is in the slit. Without considering in detail the operation of the following mechanism during the interval that the trace is gradually moving to this point it may be merely mentioned that the instantaneous condition now to be assumed actually takes place gradually. From Fig. 4 it will be noted that tube $V_3$ will be conducting for a longer period of time than before. This is represented by the time interval $t_3'$. Tube $V_2$ will be conducting for a shorter time interval represented by the interval $t_2'$. These two time intervals are always complementary and their sum is made exactly equal to the period of the sweep. It will be evident under the conditions now assumed that the voltage on the grid of tube $V_2$ suddenly rises as indicated by the dotted lines after the time interval $t_3'$ so that condenser $C_3$ receives a larger charge than does condenser $C_2$.

As described in the aforesaid patent, unequal charges on condensers $C_2$ and $C_3$ will cause the servo-mechanism to operate to shift the phase of the voltage picked up by rotor winding 135 in motor M2. This phase shift is represented by the distance X in Fig. 4 so that the rectified voltage appearing on the grid of $V_3$ is now represented by the dotted curve. Distance X equals the distance between the two voltage peaks shown in Fig. 4 for tube $V_2$ so that the time during which condenser $C_3$ is now charging is represented by the time interval $t_3''$ and the time that condenser $C_2$ is charging is represented by the time interval $t_2''$. These two time intervals are now again equal so that the charges on the two condensers are brought back to equality. The servo-mechanism will thus cause the recorder unit to produce a trace at every instant corresponding with the position of the trace 28 between points 5 and 6 and will consequently continue to do so regardless of the position of the trace. This trace may be thus accurately reproduced on the duplicate chart as described in the aforesaid patent. Moreover, it will be understood that the recorder unit may be used to simply indicate the position of the curve with respect to a fixed reference point, for example, the left edge of the chart, instead of actually making a permanent record.

While it is frequently necessary to convert the record values into mechanical position or motion which, of course, must be done where a duplicate chart is to be made, it will be apparent that the inertia involved in such a conversion limits the linear frequency response to far lower values than that of which the apparatus of this invention is capable. For some purposes it is unnecessary to convert the output to mechanical values. This is particularly true where the device is used to inject corrections in recorded data where the information to be corrected appears as a voltage or current and is corrected by the algebraic addition of voltage or current. For such use it will be obvious that either of the two voltages produced and used to control the servo-system may be readily converted into a form which can be directly connected in series or multiple with other similar circuits to provide the desired correction electrically without the frequency limitations noted. When operated in this manner the balancing phase shift device M2 either may be adjusted manually or may be replaced by fixed or partially adjustable reactance elements used only to establish the scanning reference edge which is determined by the instant tube $V_3$ is triggered. The circuit would then cease to operate as a self-balancing device and the voltage across $C_3$ would continuously represent the displacement of the record trace from the reference edge of the chart.

Referring to Fig. 3, this type of operation may be further illustrated by considering that the mechanical position of winding 135 is manually adjusted to cause $V_3$ to fire at the instant the beam starts from the left edge of the chart. If a voltmeter VM is now connected across condenser $C_3$, it will read directly proportional to the distance that trace 28 appears from the left-hand edge of the chart. With the adjustments made as previously described, it will be evident that if the voltmeter is connected across condenser $C_2$ it will continuously indicate directly proportional to the distance between the instantaneous position of the trace 28 and the right-hand edge of the chart. The voltmeter will give the same continuous indication that the recorder stylus would give when the servo-system is used and, as already mentioned, either of these voltages can be continuously employed to automatically correct previously recorded data without any electromechanical conversion.

What is claimed is:

1. An electronic sensing head for a curve follower for following the curve on a chart comprising a television image tube having a light receiving means, an electronic scanning beam and a means for deflecting said beam in at least one plane, a support for holding said tube with its light receiving axis in a fixed position relative to a surface of the chart to be scanned, said support comprising an optically opaque enclosure with the tube mounted at one end thereof and with a scanning slit at the opposite end thereof, an optical system mounted in the light path of the tube for focusing the image of the chart upon said light receiving means, sweep circuits connected to said deflecting means for repeatedly deflecting said beam in a direction crossing the image of the curve whereby electric signal pulses are generated in said tube as the beam crosses said image, and a circuit means for connecting said tube to a servo-mechanism for following the curve in response to said pulses.

2. The combination of claim 1 and a cylindrical fluorescent lamp mounted in a fixed position outside said enclosure and substantially parallel to the slit.

3. The combination of claim 1 and an elongated light source mounted in a fixed position relative to said light receiving means for illuminating said chart.

4. An electronic means for indicating the position of a point on a curve with respect to a fixed reference point comprising a television image tube having a light receiving means, an electronic scanning beam and a means for deflecting said beam in at least one plane, a support for holding said tube with its light receiving axis in a fixed position relative to the surface of an object containing said curve, an optical system mounted in the light path of the tube for focusing the image of said object upon said light receiving means, sweep circuits connected to said deflecting means for repeatedly deflecting said beam in a direction crossing the image of the curve whereby electric signal pulses are generated in said tube as the beam crosses said image, a capacitor and a means for charging said capacitor to a voltage which is a function of time, synchronizing means connected between said sweep circuit and said charging means for synchronizing the start of the sweep from a fixed reference point with the commencement of charge on said capacitor, circuits coupling said tube to said charging means whereby the pulse generated in the tube stops the charging of said capacitor, and means responsive to the voltage on said capacitor for indicating the position of the point on the curve crossed by the beam with respect to the fixed reference point.

ARTHUR L. HOLCOMB.

References Cited in the file of this patent

UNITED STATES PATENTS

| Number | Name | Date |
| --- | --- | --- |
| 2,532,098 | Holcomb | Nov. 28, 1950 |
| 2,573,006 | Good | Oct. 30, 1951 |
| 2,578,939 | Moran, Jr. | Dec. 18, 1951 |